United States Patent
Kleinschnitz et al.

(10) Patent No.: US 8,959,058 B1
(45) Date of Patent: Feb. 17, 2015

(54) LINKING DYNAMIC COMPUTER DATA PROTECTION TO AN EXTERNAL STATE

(75) Inventors: Donald Kleinschnitz, Sandy, UT (US); Val Arbon, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 937 days.

(21) Appl. No.: 10/934,615

(22) Filed: Sep. 2, 2004

(51) Int. Cl.
*G06F 17/30* (2006.01)

(52) U.S. Cl.
USPC ........... 707/670; 707/644; 707/654; 707/655; 707/661; 707/667

(58) Field of Classification Search
CPC ................................ G06F 17/30; G06F 17/00
USPC ........................................ 707/200, 201, 204
See application file for complete search history.

(56) References Cited

U.S. PATENT DOCUMENTS

| | | | | |
|---|---|---|---|---|
| 5,649,196 | A * | 7/1997 | Woodhill et al. | 711/148 |
| 5,778,395 | A * | 7/1998 | Whiting et al. | 1/1 |
| 5,835,953 | A * | 11/1998 | Ohran | 711/162 |
| 6,023,507 | A * | 2/2000 | Wookey | 709/224 |
| 6,085,244 | A * | 7/2000 | Wookey | 709/224 |
| 6,088,803 | A | 7/2000 | Tso et al. | |
| 6,550,057 | B1 * | 4/2003 | Bowman-Amuah | 717/126 |
| 7,330,997 | B1 * | 2/2008 | Odom | 714/6.23 |
| 7,363,359 | B1 * | 4/2008 | Tripathy et al. | 709/223 |
| 7,472,349 | B1 * | 12/2008 | Srivastava et al. | 1/1 |
| 7,584,208 | B2 * | 9/2009 | Spivack et al. | 1/1 |
| 7,640,267 | B2 * | 12/2009 | Spivack et al. | 1/1 |
| 8,161,066 | B2 * | 4/2012 | Spivack et al. | 707/770 |
| 8,190,684 | B2 * | 5/2012 | Spivack et al. | 709/205 |
| 2002/0120685 | A1 * | 8/2002 | Srivastava et al. | 709/203 |
| 2007/0180490 | A1 * | 8/2007 | Renzi et al. | 726/1 |
| 2008/0177994 | A1 * | 7/2008 | Mayer | 713/2 |
| 2013/0036088 | A1 * | 2/2013 | Orenstein et al. | 707/610 |

OTHER PUBLICATIONS

Van der Walt, Charl; "Assessing Internet Security Risk, Part 1: What is Risk Assessment", Jun. 11, 2002, Security Focus, pp. 1-5.*
Kaczmarski, M., et al., "Beyond backup toward storage management," 2003, IBM Systems Journal, vol. 42, Issue 2, pp. 322-337 (16 total pages).*
Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

* cited by examiner

*Primary Examiner* — Farhan Syed
(74) *Attorney, Agent, or Firm* — Fenwick & West LLP

(57) ABSTRACT

A data backup manager links data backup robustness to an external state. The data backup manager monitors the external state. Responsive to the external state, the data backup manager adjusts parameters controlling data backup, such as backup frequency, backup content, and backup retention time. The data backup manager can increase these parameters responsive to an increase in an external distress state level, and decrease them in response to a decrease in the external distress state level.

19 Claims, 4 Drawing Sheets

US 8,959,058 B1

LINKING DYNAMIC COMPUTER DATA PROTECTION TO AN EXTERNAL STATE

TECHNICAL FIELD

This invention pertains generally to enabling dynamic computer data protection by linking backup with an external state.

BACKGROUND

Currently, computer data (for example, data stored on disk volumes) are backed up either on pre-set schedules, or in the event of a known impending disaster (for example, a loss of power, an imminent flood, etc.). This leaves any new or modified data fully vulnerable between backups, because it is not possible to recover data more recent than the last executed backup.

On the other hand, each executed backup uses both computing cycles and storage resources. Therefore, although backing up frequently is safer in terms of data integrity, it can become very resource expensive. Traditionally, a compromise has been reached for each protected system by balancing the time between backups (the window of vulnerability) and the resources needed or available to perform or hold the backup data.

In contemporary computing environments, information from external sources concerning the stability of the system is often available. For example, a malicious code threat assessment system can provide information regarding a current threat level. However, today's backup systems do not leverage external states to enhance data backup management.

What is needed are methods, systems and computer readable media to improve backup management, by automatically adjusting the frequency and/or data granularity of backups responsive to states external to the backup system.

SUMMARY OF INVENTION

The present invention comprises methods, systems and computer readable media for linking data backup robustness to an external state. In some embodiments, a data backup manager monitors an external state (such as a security threat assessment or other distress level). Responsive to the external state, the data backup manager adjusts parameters controlling data backup. The parameters to modify can include backup frequency, backup content, and backup retention time. The data backup manager can increase these parameters responsive to an increase in an external distress state level, and decrease them in response to a decrease in the external distress state level. Thus, the data backup manager ties the allocation of resources devoted to data backup to anticipated need.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
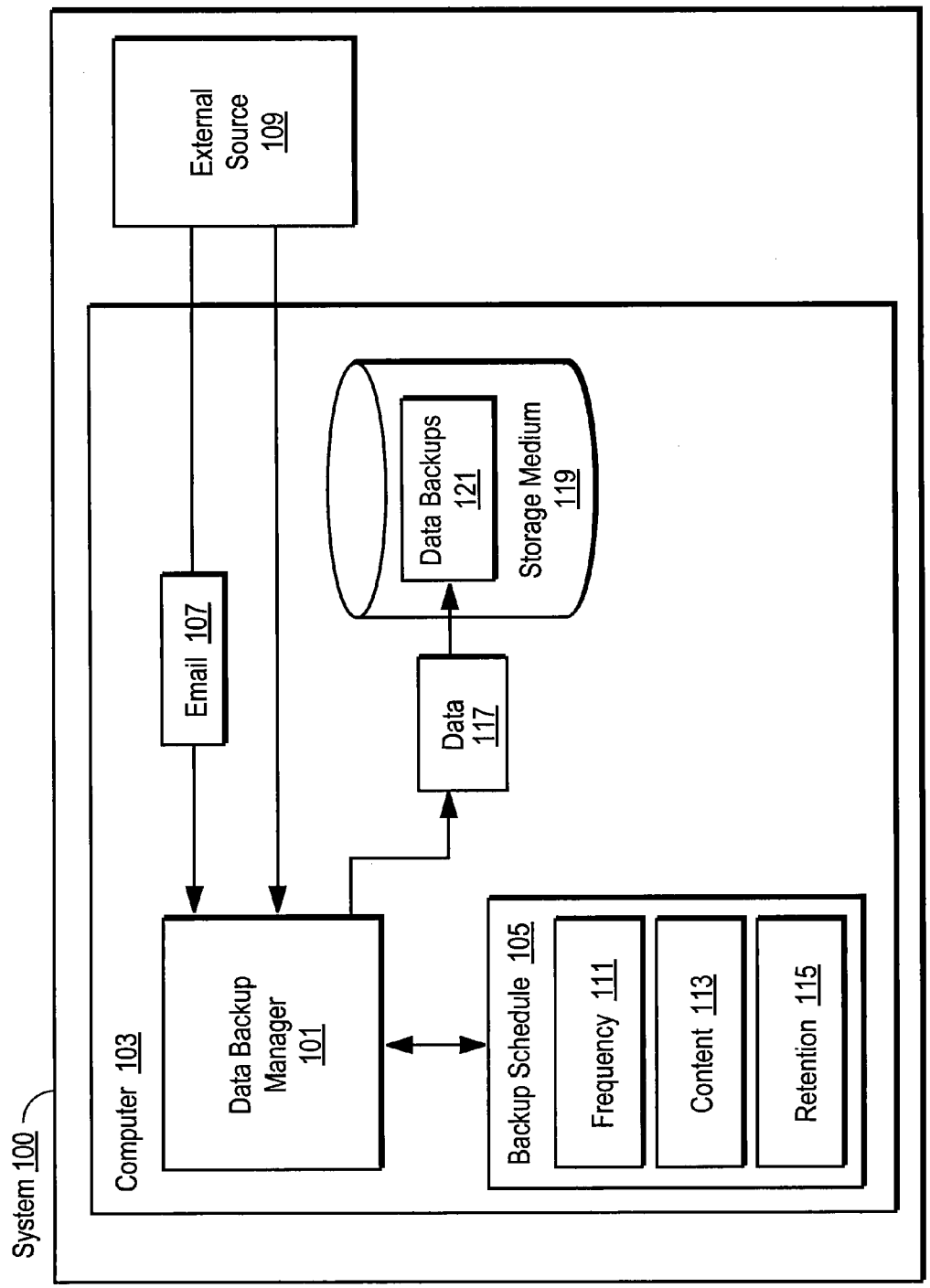
FIG. 1 is a block diagram illustrating a high level overview of a system for performing some embodiments of the present invention.

FIG. 1 illustrates a high level overview of a system 100 for performing some embodiments of the present invention. A data backup manager 101 runs in a computer 103, and modifies a backup schedule 105 (or in other embodiments other backup characteristics) responsive to an external state, thereby linking backup robustness to an external state. It is to be understood that although the data backup manager 101 is illustrated as a single entity, as the term is used herein a data backup manager 101 refers to a collection of functionalities which can be implemented as software, hardware, firmware or any combination of the three. Where a data backup manager 101 is implemented as software, it can be implemented as a standalone program, but can also be implemented in other ways, for example as part of a larger program, as a plurality of separate programs, or as one or more statically or dynamically linked libraries.

The data backup manager 101 monitors a state external to the backup system, such as an external distress state level state (for example, an external security threat assessment, an external computing resource overload assessment, an external software stability assessment, etc.). In some embodiments of the present invention, the data backup manager 101 monitors an external state by receiving e-mails 107 (or other forms of electronic notification, for example, control signals) from an external source 109 (for example, a threat assessment system) regarding the external state. In other embodiments, the data backup manager 101 reads data (for example, a global variable, a buffer, a port) external to the data backup manager 101 concerning the external state. Typically, such data is provided by an external source 109. It is to be understood that although the external source 109 in FIG. 1 is illustrated as being external to the computer 103 on which the data backup manager 101 resides (for example, elsewhere on a local or wide area network, on the Internet, etc.), in some embodiments the external source 109 is located on the same computer 103 as the data backup manager 101. The external source 109 and state are external to the data backup manager 101, but need not be external to the physical computer 103 on which the data backup manager 101 executes.

As illustrated in FIG. 1, responsive to the external source, the data backup manager 101 modifies the backup schedule 105 by adjusting parameters such as the backup frequency 111, the content 113 to backup and/or the retention 115 time for executed backups. The data backup manager 101 backups data 117 from the computer 103 to a storage medium 119, on which it retains the data backups 121 for the scheduled amount of time. Note that the storage medium 119 in FIG. 1 is illustrated as being on the computer 103 on which the data backup manager 101 executes (for example, a disk drive or a tape in a local tape drive). Of course, in some embodiments, the storage medium 119 (or media 119) resides external to that computer 103, for example in the form of a magnetic or optical medium located elsewhere on a local or wide area network, on the Internet, etc.

Figure 2:
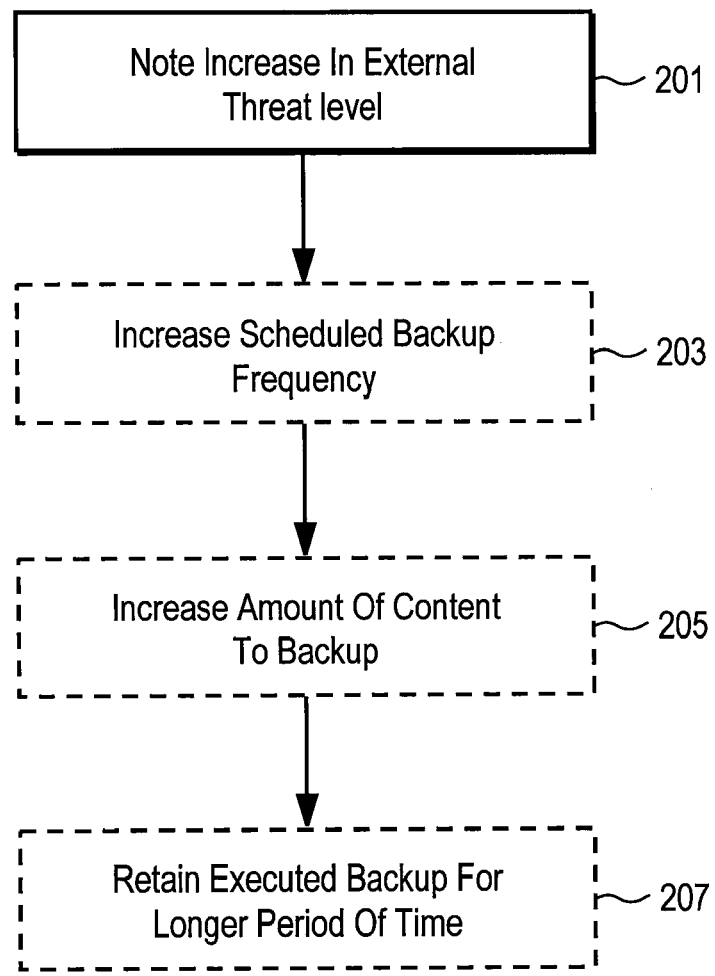
FIG. 2 is a flowchart, illustrating steps for tuning the backup schedule responsive to an external distress state, according to one embodiment of the present invention.

FIG. 2 is a flowchart, illustrating steps for the data backup manager 101 tuning the backup schedule 105 responsive to an external distress state, according to one embodiment of the present invention. As illustrated in FIG. 2, the data backup manager 101 notes 201 an increase in the external distress level. Responsive to the external distress state level increasing, the data backup manager 101 can increase 203 the scheduled backup frequency 111, increase 205 the amount of content 113 to backup, and/or retain 207 executed backups 121 for longer periods of time.

Increasing 203 the frequency of data backups 121 reduces the window of vulnerability for stored data 117 during times of high threat. Also in the event of a successful attack or system compromise, increasing 203, 205, 207 backup frequency, depth and/or retention periods increases the possibility of recovering unmodified or undamaged versions of the data 117 as they existed before the failure.

Figure 3:
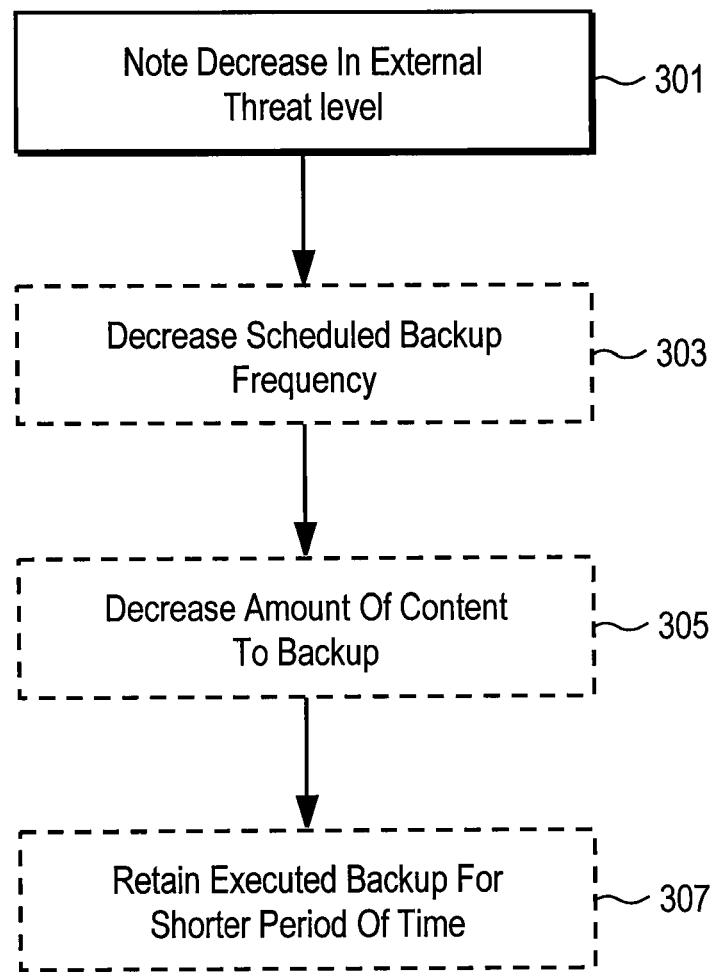
FIG. 3 is a flowchart, illustrating steps for tuning the backup schedule responsive to an external distress state, according to another embodiment of the present invention.

FIG. 3 is a flowchart, illustrating steps for the data backup manager 101 tuning the backup schedule 105 responsive to an external distress state, according to another embodiment of the present invention. The data backup manager 101 notes 301 a decrease in the external distress level. Responsive to the decrease in the external distress level, the data backup manager 101 can decrease 303 the scheduled backup frequency 111, decrease 305 the amount of content 113 to backup, and/or retain 307 executed backups 121 for shorter periods of time. This saves storage and/or computational resources when threat levels are low.

Figure 4:
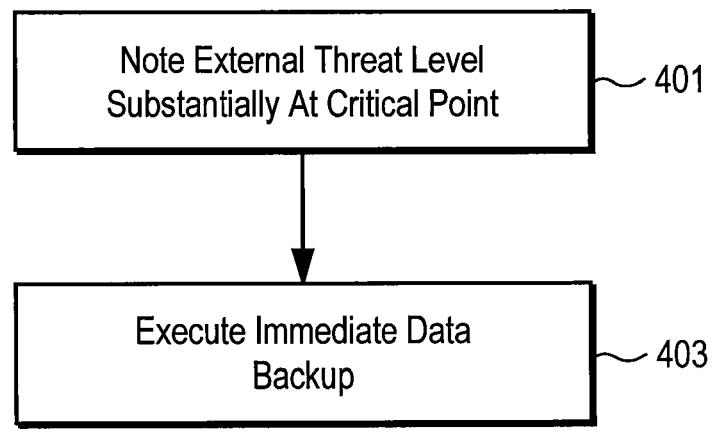
FIG. 4 is a flowchart, illustrating steps for tuning the backup schedule responsive to an external distress state, according to yet another embodiment of the present invention.

FIG. 4 is a flowchart, illustrating steps for the data backup manager 101 tuning the backup schedule 105 responsive to an external distress state, according to yet another embodiment of the present invention. As illustrated in FIG. 4, the data backup manager 101 can note 401 that an external threat level is substantially at a critical point. In response, the data backup manager 101 executes 403 an immediate data backup 121. Note that what constitutes a critical point is a variable design choice.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for linking data backup robustness to an external state, the method comprising the steps of:
  executing a data backup manager for managing a backup system on a computer, the executing data backup manager performing steps comprising:
    monitoring, by the data backup manager on the computer, a state external to the backup system indicating an external distress state level of an external source that is distinct from the backup system on the computer by receiving an electronic notification from the external source;
    noting, by the data backup manager on the computer, a change to the external distress state level of the external source responsive to the monitoring; and
    automatically tuning, by the data backup manager on the computer, a backup schedule of the backup system on the computer responsive to the noted change to the external distress state level of the external source, automatically tuning the backup schedule comprising:
      increasing a scheduled backup frequency of the backup system on the computer responsive to the noted change being an increase in the external distress state level of the external source; and
      decreasing a scheduled backup frequency of the backup system on the computer responsive to the noted change being a decrease in the external distress state level of the external source.

2. The method of claim 1, wherein automatically tuning the backup schedule further comprises:
  responsive to the noted change being an increase in the external distress state level of the external source, automatically adjusting at least one data backup characteristic from a group of adjustments consisting of:
    increasing an amount of content to backup; and
    retaining executed backups for longer periods of time.

3. The method of claim 1, wherein automatically tuning the backup schedule further comprises:
  responsive to the noted change being a decrease in the external distress state level of the external source, automatically adjusting at least one data backup characteristic from a group of adjustments consisting of:
    decreasing an amount of content to backup; and
    retaining executed backups for shorter periods of time.

4. The method of claim 1, wherein automatically tuning the backup schedule further comprises:
  responsive to the noted change being an indication that the external distress state level of the external source has reached a critical point, executing an immediate data backup by the backup system.

5. The method of claim 1 wherein monitoring the state external to the backup system comprises:
  performing at least one action from a group of actions consisting of:
    receiving an e-mail from the external source regarding the external state; and
    reading data from the external source concerning the external state.

6. A non-transitory computer readable storage medium containing a computer program product for linking data backup robustness to an external state, the computer program product comprising program code for:

executing a data backup manager for managing a backup system on a computer, the executing data backup manager performing steps comprising:

monitoring, by the data backup manager on the computer, a state external to the backup system indicating an external distress state level of an external source that is distinct from the backup system on the computer by receiving an electronic notification from the external source;

noting, by the data backup manager on the computer, a change to the external distress state level of the external source responsive to the monitoring; and automatically tuning, by the data backup manager on the computer, a backup schedule of the backup system on the computer responsive to the noted change to the external distress state level of the external source, automatically tuning the backup schedule comprising:

increasing a scheduled backup frequency of the backup system on the computer responsive to the noted change being an increase in the external distress state level of the external source; and decreasing a scheduled backup frequency of the backup system on the computer responsive to the noted change being a decrease in the external distress state level of the external source.

7. The computer-readable storage medium of claim 6, wherein automatically tuning the backup schedule further comprises:

responsive to the noted change being an increase in the external distress state level of the external source, automatically adjusting at least one data backup characteristic from a group of adjustments consisting of:
increasing an amount of content to backup; and
retaining executed backups for longer periods of time.

8. The computer-readable storage medium of claim 6, wherein automatically tuning the backup schedule further comprises:

responsive to the noted change being a decrease in the external distress state level of the external source, automatically adjusting at least one data backup characteristic from a group of adjustments consisting of:
decreasing an amount of content to backup; and
retaining executed backups for shorter periods of time.

9. The computer-readable storage medium of claim 6, wherein automatically tuning the backup schedule further comprises:

responsive to the noted change being an indication that the external distress state level of the external source has reached a critical point, executing an immediate data backup by the backup system.

10. The computer-readable storage medium of claim 6, wherein monitoring the state external to the backup system comprises:

performing at least one action from a group of actions consisting of:
receiving an e-mail from the external source regarding the external state; and
reading data from the external source concerning the external state.

11. A computer system for linking data backup robustness to an external state, the computer system comprising:

a non-transitory computer-readable storage device storing software portions executable for:

executing a data backup manager for managing a backup system on a computer, the executing data backup manager performing steps comprising:

monitoring, by the data backup manager on the computer, a state external to the backup system indicating an external distress state level of an external source that is distinct from the backup system on the computer by receiving an electronic notification from the external source, the monitored state indicating at least one of a computing resource overload assessment and an external software stability assessment;

noting, by the data backup manager on the computer, a change to the external distress state level of the external source responsive to the monitoring; and automatically tuning, by the data backup manager on the computer, a backup schedule of the backup system on the computer responsive to the noted change to the external distress state level of the external source, automatically tuning the backup schedule comprising:

increasing a scheduled backup frequency of the backup system on the computer responsive to the noted change being an increase in the external distress state level of the external source;

decreasing a scheduled backup frequency of the backup system on the computer responsive to the noted change being a decrease in the external distress state level of the external source; and executing an immediate data backup by the backup system on the computer responsive to the noted change being an indication that the external distress state level of the external source has reached a critical point.

12. The computer system of claim 11, wherein automatically tuning the backup schedule further comprises:

responsive to the noted change being an increase in the external distress state level of the external source, automatically adjusting at least one data backup characteristic from a group of adjustments consisting of:
increasing an amount of content to backup; and
retaining executed backups for longer periods of time.

13. The computer system of claim 11, wherein automatically tuning the backup schedule further comprises:

responsive to the noted change being a decrease in the external distress state level of the external source, automatically adjusting at least one data backup characteristic from a group of adjustments consisting of:
decreasing an amount of content to backup; and
retaining executed backups for shorter periods of time.

14. The computer system of claim 11, wherein monitoring the state external to the backup system comprises:

performing at least one action from a group of actions consisting of:
receiving an e-mail from the external source regarding the external state; and
reading data from the external source concerning the external state, the data comprising at least one of a global variable, buffer, or port.

15. The method of claim 1, wherein monitoring the state external to the backup system indicating an external distress state level comprises:
monitoring a computing resource overload assessment.

16. The method of claim 1, wherein monitoring the state external to the backup system indicating an external distress state level comprises:
monitoring an external software stability assessment.

17. The method of claim 1, wherein the external distress state level comprises a security threat assessment.

18. The method of claim 1, wherein automatically tuning a backup schedule of the backup system one the computer responsive to the noted change to the external distress state level comprises:
    adjusting parameters controlling the backup system to tie an allocation of resources devoted to the backup system on the computer to an anticipated need for the resources.

19. The method of claim 1, wherein monitoring the state external to the backup system comprises:
    receiving data from an external source external to the backup system.

\* \* \* \* \*